United States Patent [19]
Hubler

[11] Patent Number: 6,062,540
[45] Date of Patent: May 16, 2000

[54] DOUBLE SEAL DRAIN COCK

[75] Inventor: William T. Hubler, Sheboygan Falls, Wis.

[73] Assignee: Thomas Industries Inc., Sheboygan, Wis.

[21] Appl. No.: 09/189,348

[22] Filed: Nov. 10, 1998

[51] Int. Cl.[7] .................................................... F16K 5/02
[52] U.S. Cl. .......................................... 251/216; 251/351
[58] Field of Search .................................... 251/351, 215, 251/216

[56]  References Cited

U.S. PATENT DOCUMENTS

| | | |
|---|---|---|
| 571,216 | 11/1896 | Crowson . |
| 1,465,952 | 8/1923 | Smith et al. . |
| 2,804,279 | 8/1957 | Gould ........................................ 251/351 |
| 2,859,932 | 11/1958 | Mackal ...................................... 251/347 |
| 3,643,917 | 2/1972 | Griffiths et al. .......................... 251/215 |
| 3,924,773 | 12/1975 | Wilkinson .............................. 220/88 B |
| 3,948,481 | 4/1976 | Pollock ...................................... 251/351 |
| 4,307,748 | 12/1981 | Mathias ...................................... 137/381 |
| 4,529,167 | 7/1985 | Harrison et al. ........................... 251/144 |
| 4,986,502 | 1/1991 | Ceroke ....................................... 251/216 |
| 5,368,181 | 11/1994 | Myers ....................................... 251/216 |

Primary Examiner—Kevin Shaver
Assistant Examiner—Eric Keasel
Attorney, Agent, or Firm—Quarles & Brady LLP

[57] ABSTRACT

A drain cock device for venting or draining gas or liquid from a pressurized vessel, such as an air compressor, that provides occlusive closure of an opening in the pressurized vessel. When the drain cock is in an open position, gas or liquid may exit the vessel though an open cavity in a valve stem. The drain cock includes primary and back up seals that form by threading a stem through a housing aperture to a closed position. The primary seal is formed by a resilient sealing member tightly contacting the housing valve seat. The back up seal is formed by the rigid, conical surface of the valve stem mating with a rigid valve seat in the housing aperture. The double seal arrangement provides a dependable occlusive seal because the back up seal safeguards leakage in the event of primary seal failure. The drain cock reduces the likelihood of such failure because the surface to surface back up seal alleviates the transverse forces to which the primary resilient seal is subjected. Additionally, because the valve and valve seat are rigid members, the backup valve is not susceptible to deformation or costly repair.

8 Claims, 2 Drawing Sheets

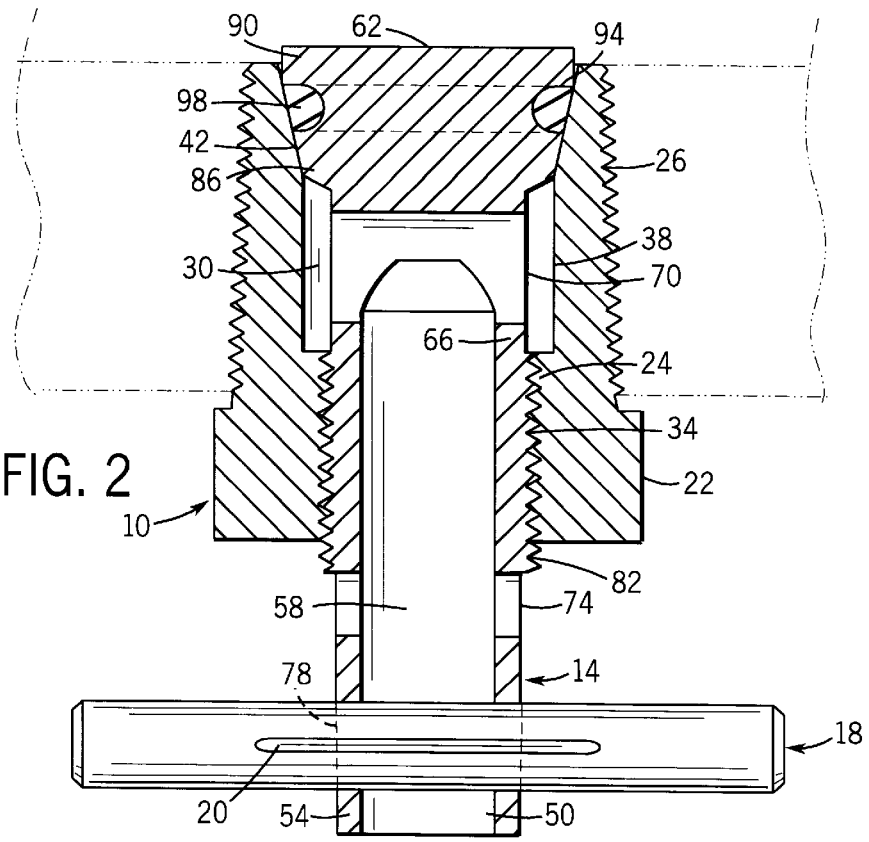
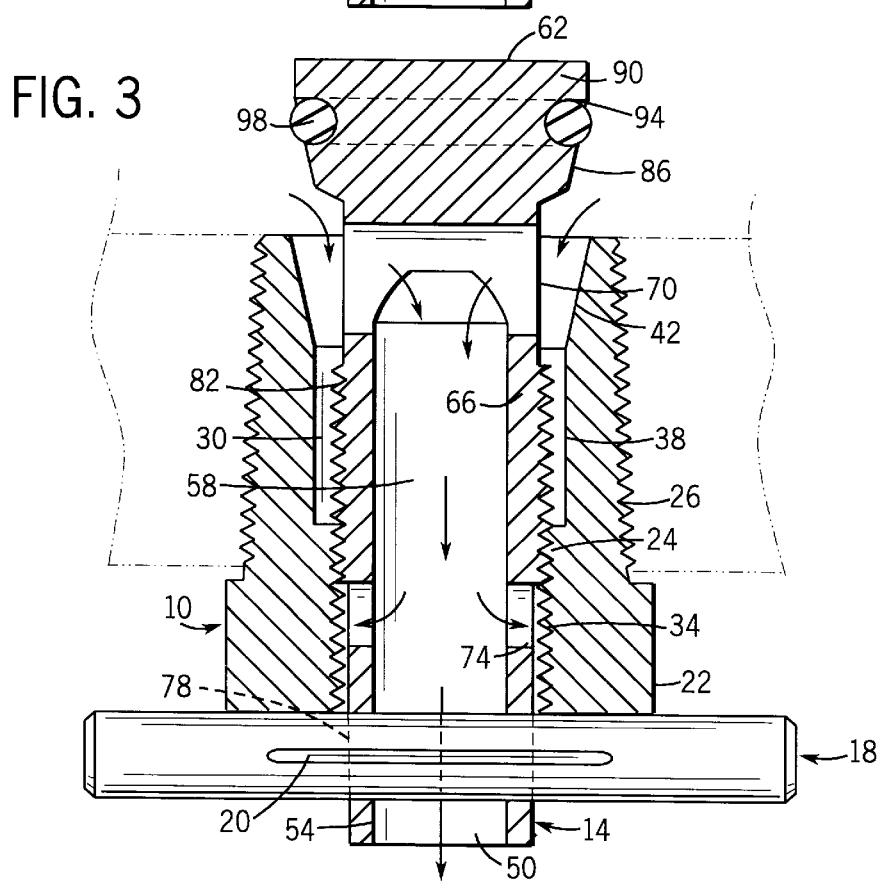

DOUBLE SEAL DRAIN COCK

CROSS-REFERENCE TO RELATED APPLICATIONS

STATEMENT REGARDING FEDERALLY SPONSORED RESEARCH OR DEVELOPMENT

BACKGROUND OF THE INVENTION

The invention relates to the field of valves, and in particular to drain cocks for releasing gas or liquid from pressurized vessels.

Drain cocks currently used for releasing gas or liquid from vessels typically provide only a single seal, a double seal formed exclusively by contact with deformable material, or a double seal formed by line contact with non-deformable material. Single seal drain cocks, such as in U.S. Pat. No. 1,465,952, to Smith et al, issued Aug. 28, 1923, do not provide a back up seal for failsafe protection from gas or fluid leakage in high pressure environments, such as air compressors. Double seal drain cocks with seals consisting of deformable material exclusively, such as in U.S. Pat. No. 4,529,167, to Harrison et al, issued Jul. 16, 1985, often require costly replacement of damaged or permanently deformed sealing elements due to the high forces to which they are subjected. Double seal drain cocks utilizing line contact seals between non-deformable material, such as U.S. Pat. No. 4,307,748, to Mathias, issued Dec. 29,1981, are similarly susceptible to costly replacement and inadequate sealing. Accordingly, the present invention overcomes the deficiencies of the prior art by providing a double seal drain cock that utilizes a surface contact seal between two non-deformable materials.

SUMMARY OF THE INVENTION

The drain cock includes a housing that is fastenable to the wall of an opening in a vessel or container. The housing contains a longitudinal aperture with a rigid, conical valve seat portion and a threaded portion to which is threaded a valve stem. The stem has a substantially longitudinal cavity extending to an opened end and has at least one radial port proximate a valve end of the stem, through which the gas or fluid inside the vessel may be released. The valve end of the stem has a rigid conical valve portion that is sealably mateable with the surface of the seat portion of the housing aperture. The valve end also has a circumferential groove that can retain a resilient sealing member, such as an o-ring, which is sealable with the housing seat portion. Attached proximate the open end of the stem is a handle for threading the stem through the housing. In its preferred embodiment, the drain cock has at least two opposing sets of radial ports proximate the opening in the stem, through one set of which a substantially cylindrical pin is press fit to form the handle.

An objective of the invention is to create a drain cock with a back up safety seal in the event the primary seal fails. Moreover, the invention is intended to provide an occlusive back up seal that reduces the forces acting on the resilient seal so as to reduce the instance of primary seal failure and costly replacement. This invention accomplishes these objectives by sealably mating the surfaces of the rigid valve stem and the rigid valve seat.

Another objective of the invention is to allow the venting or draining of a vessel with hand adjustment of the drain cock. This objective is met by providing a handle on the stem capable of threadably advancing or withdrawing the stem through the housing aperture.

BRIEF DESCRIPTION OF THE DRAWINGS

FIG. 2 shows the drain cock of FIG. 1 in vertical cross section, depicted in closed position, and threaded into the wall of a vessel, shown in phantom lines; and FIG. 3 shows the drain cock of FIG. 1 in vertical cross section, depicted in open position, and threaded into the wall of a vessel, shown in phantom lines.

DETAILED DESCRIPTION OF THE PREFERRED EMBODIMENT

Figure 1:
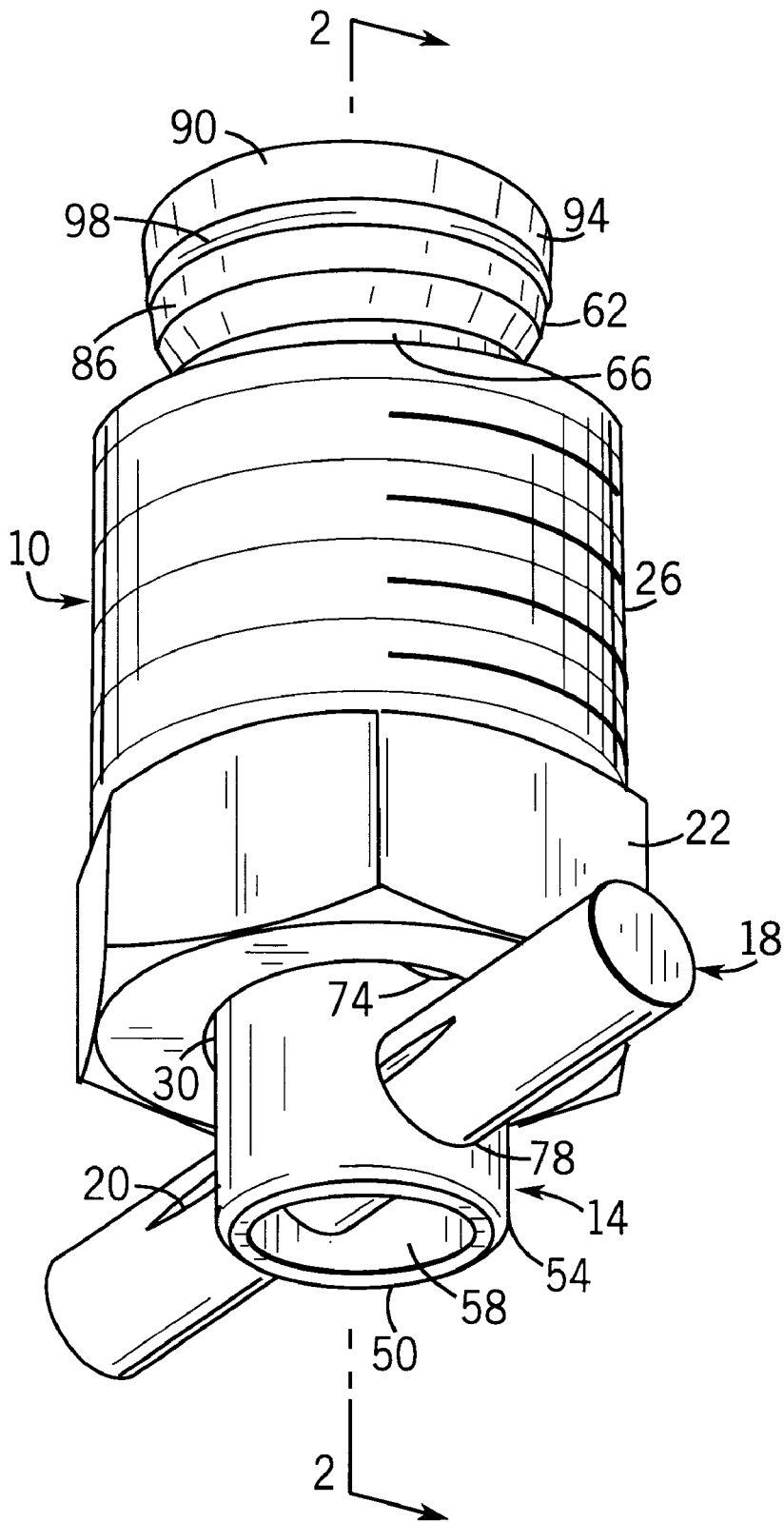
FIG. 1 shows a drain cock in accordance with the present invention in perspective view, depicted in open position.

Referring to FIG. 1 therein is illustrated a drain cock in accordance with the present invention, shown in perspective view in open position. The drain cock includes as major elements an annular housing 10, a cylindrical stem 14 and a cylindrical pin handle 18. The housing 10 includes a nut portion 22 at the bottom end 24, having a hexagonal lateral cross section. The remainder 26 of housing 10 is externally threaded into the wall of a vessel. The housing 10 contains a longitudinal aperture 30 through which the stem 14 is engageable and movable. As best illustrated in FIG. 3, at least three portions define the interior of the aperture 30 in its preferred embodiment. A threaded portion 34, begins at the bottom end 24 of the housing 10 and extends to a middle portion 38; the middle portion 38 steps to a larger diameter than the threaded portion 34; and a seat portion 42 extends radially outward at approximately twelve degrees from the middle portion 38, resulting in a conical valve seat.

As shown in FIG. 2, the stem 14 contains a longitudinal cavity 58 extending from an opening 50 at the bottom end 54 throughout the stem trunk 66 to a valve end 62 of the stem 14. As illustrated in FIG. 3, the stem trunk 66 contains three sets of radial ports; the first set of ports 70 is located proximate the valve end 62 of the stem 14 and the second 74 and third 78 sets of ports are located proximate the bottom end 54 of the stem 14. The pin handle 18, containing multiple longitudinal key slots 20 therein, is centered lengthwise, and press fit through, the third set of ports 78. Stem threads 82 are located between the first 70 and second 74 set of ports. The valve end 62 of the stem 14 has a generally larger diameter than the stem trunk 66. The diameter of the valve end 62 is defined by at least two portions. The valve portion 86 initially ramps outward to a larger diameter than the stem trunk 66. It then extends radially outward, at approximately twelve degrees, to a cylindrical portion 90 resulting in a conical valve surface suitable to mate with the seat portion 42 of the housing aperture 30 when the drain cock is in closed position, as illustrated in FIG. 2. The valve portion 86 contains a circumferential groove 94 that mounts a sealing member 98, such as a conventional resilient o-ring. A cylindrical portion 90 is of uniform diameter equal to the largest diameter of the valve portion 86.

In the intended operation of the drain cock, the housing 10 is threaded to the wall of a vessel by application of a rotational force to the wrench receiving member 22. The stem 14 is threadably advanced through the housing aperture 30 by application of rotational force to the pin 18 to the closed position shown in FIG. 2. A seal is formed by the resilient sealing member 98 contacting the housing valve seat portion 42. Also, the stem valve portion 86 mates with the seat portion 42 of the housing aperture 30 forming an auxiliary, surface seal (rather than a line seal) between the housing 10 and the stem 14. It will be noticed that the surface seal does not require deformation of stem or housing, and it alleviates transverse forces ordinarily applied to sealing member 98, thus avoiding o-ring shearing and blow-off. As the stem 14 is rotated and moved to an open position, depicted in FIG. 3, gas or fluid may enter the first set of ports 70 in the stem 14, flow axially through cavity 58 in stem 14, and exit through the second set of ports 74 or the opening 50 at the bottom end 54 of the stem 14, as shown by the arrows in FIG. 3.

Brass is a suitable material for the housing 10 and the stem 14 and steel is suitable for the pin 18. The sealing member 98 may be made of ethylenepropylene material.

I claim:

1. A drain cock, comprising:

a housing fastenable to a vessel, having a longitudinal aperture therethrough terminating at openings at a valve end and a threaded end, the aperture defining internal threads at the threaded end, a rigid valve seat at the valve end and a passageway therebetween, the valve seat defining an internal conical sealing surface extending from the passageway to the valve end opening whereat the aperture has an increased inner diameter;

a stem disposed within the longitudinal aperture of the housing having at one end a valve head defining a rigid external conical sealing surface and a circumferential groove and at an opposite end a handle for rotating the stem in relation to the housing between opened and closed positions, the stem also having internal threads disposed between a radial inlet port and a radial outlet port; and a resilient sealing member disposed within the valve head groove;

whereby, in the closed position, the external sealing surface and the sealing member of the valve head each separately mate with the internal sealing surface of the housing so as to form a double seal, and, in the opened position, a drain passageway exists between the valve end and threaded end openings in the housing formed in part by communication of the inlet and outlet ports with the stem aperture.

2. The drain cock of claim 1, wherein in the stem and the housing are coupled via the threads in both the opened and closed positions.

3. The drain cock of claim 2, wherein the drain passageway primarily bypasses the threaded connection of the stem to the housing.

4. The drain cock of claim 1, wherein the stem defines a pair of opposed inlet ports and a pair of opposed outlet ports.

5. The drain cock of claim 1, wherein the handle is a pin disposed through a pair of opposing radial ports so as to be rigidly connected to the stem.

6. The drain cock of claim 5, wherein the handle includes at least one key slot for press fitting the handle within the pair of radial ports.

7. The drain cock of claim 1, wherein the housing includes external threads about its circumference.

8. The drain cock of claim 1, wherein the resilient sealing member is an o-ring.

* * * * *